(12) United States Patent
Takeda et al.

(10) Patent No.: US 8,277,327 B2
(45) Date of Patent: Oct. 2, 2012

(54) HORSEBACK RIDING SIMULATION

(75) Inventors: Genyo Takeda, Kyoto (JP); Junji Takamoto, Kyoto (JP); Howard Cheng, Sammamish, WA (US); Noboru Wakitani, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 887 days.

(21) Appl. No.: 12/354,058

(22) Filed: Jan. 15, 2009

(65) Prior Publication Data

US 2010/0009762 A1   Jan. 14, 2010

Related U.S. Application Data

(60) Provisional application No. 61/021,198, filed on Jan. 15, 2008.

(51) Int. Cl.
*A63F 13/02*   (2006.01)

(52) U.S. Cl. ...... 463/47; 463/38; 273/148 R; 273/148 B

(58) Field of Classification Search .......... 463/7, 36–39, 463/47; 273/148 R, 148 B
See application file for complete search history.

(56) References Cited

U.S. PATENT DOCUMENTS

| | | | |
|---|---|---|---|
| 4,682,154 A * | 7/1987 | Fearon et al. | 340/572.3 |
| 4,718,661 A | 1/1988 | Wolfe | |
| 4,817,950 A * | 4/1989 | Goo | 463/36 |
| 4,935,887 A | 6/1990 | Abdalah et al. | |
| 4,957,444 A | 9/1990 | Armen | |
| 4,988,300 A | 1/1991 | Yamaguchi et al. | |
| 5,097,706 A * | 3/1992 | Le Nouvel et al. | 73/493 |
| 5,782,070 A * | 7/1998 | Knight et al. | 54/66 |
| 5,848,939 A * | 12/1998 | Smith | 472/60 |
| 5,855,483 A | 1/1999 | Collins et al. | |
| 5,860,861 A * | 1/1999 | Lipps et al. | 463/36 |
| 5,865,624 A | 2/1999 | Hayashigawa | |
| 6,164,973 A | 12/2000 | Macri et al. | |
| 6,210,167 B1 * | 4/2001 | Nishiyama | 434/247 |
| 6,210,286 B1 * | 4/2001 | Ohara et al. | 472/97 |
| 6,217,449 B1 | 4/2001 | Kaku | |
| 6,558,259 B1 | 5/2003 | Maruyama et al. | |
| 6,599,198 B2 | 7/2003 | Ettenhofer | |
| 7,175,440 B1 | 2/2007 | Bateman | |
| 7,682,154 B2 * | 3/2010 | Hojo et al. | 434/247 |
| 7,927,216 B2 | 4/2011 | Ikeda et al. | |
| 7,942,745 B2 | 5/2011 | Ikeda et al. | |

(Continued)

FOREIGN PATENT DOCUMENTS

EP   1 852 163 A2   4/2007

(Continued)

OTHER PUBLICATIONS

European search report issued in counterpart European patent application EP 09 000 494.6-1260 (Apr. 28, 2009).

(Continued)

*Primary Examiner* — Dmitry Suhol
*Assistant Examiner* — Alex F. R. P. Rada, II
(74) *Attorney, Agent, or Firm* — Nixon & Vanderhye P.C.

(57) ABSTRACT

An inflatable air cushion or other type seat a person can sit on is instrumented with electronic input devices that can sense motion of the cushion and/or motion of the person's body. Such input devices provide inputs to a computer graphics system that dynamically generates a responsive scene on a real time display. The sensed motion can be used to generate a graphics simulation of horseback riding.

18 Claims, 20 Drawing Sheets

U.S. PATENT DOCUMENTS

| | | | |
|---|---|---|---|
| 2004/0229685 A1 | 11/2004 | Smith et al. | |
| 2005/0233676 A1* | 10/2005 | Bohart | 446/313 |
| 2006/0147887 A1 | 7/2006 | Greenwood | |
| 2006/0287089 A1* | 12/2006 | Addington et al. | 463/37 |
| 2007/0287139 A1* | 12/2007 | Holm | 434/247 |
| 2008/0015017 A1* | 1/2008 | Ashida et al. | 463/37 |
| 2008/0102424 A1* | 5/2008 | Holljes | 434/247 |

FOREIGN PATENT DOCUMENTS

| | | |
|---|---|---|
| EP | 1 844 822 A1 | 10/2007 |
| GB | 2405579 A * | 3/2005 |

OTHER PUBLICATIONS

Nintendo of America Inc., Wii Zapper Operations Manual, http://www.nintendo.com/consumer/downloads/wiiZapperTri.pdf, pp. 1-10 (2006, 2009).

Nintendo of America Inc., Wii Operations Manual System Setup, http://www.nintendo.com/consumer/downloads/WiiOpMn_setup.pdf, pp. 1-40 (2006, 2009).

* cited by examiner

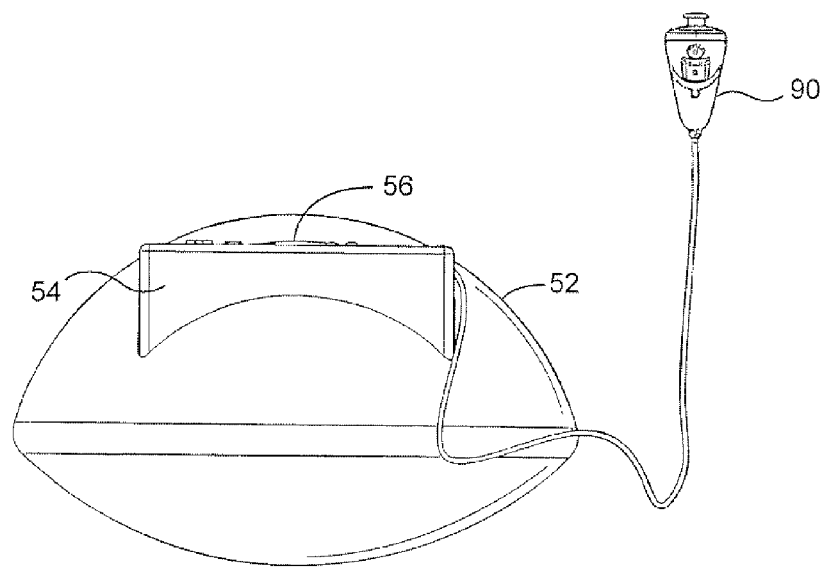
Fig. 4B
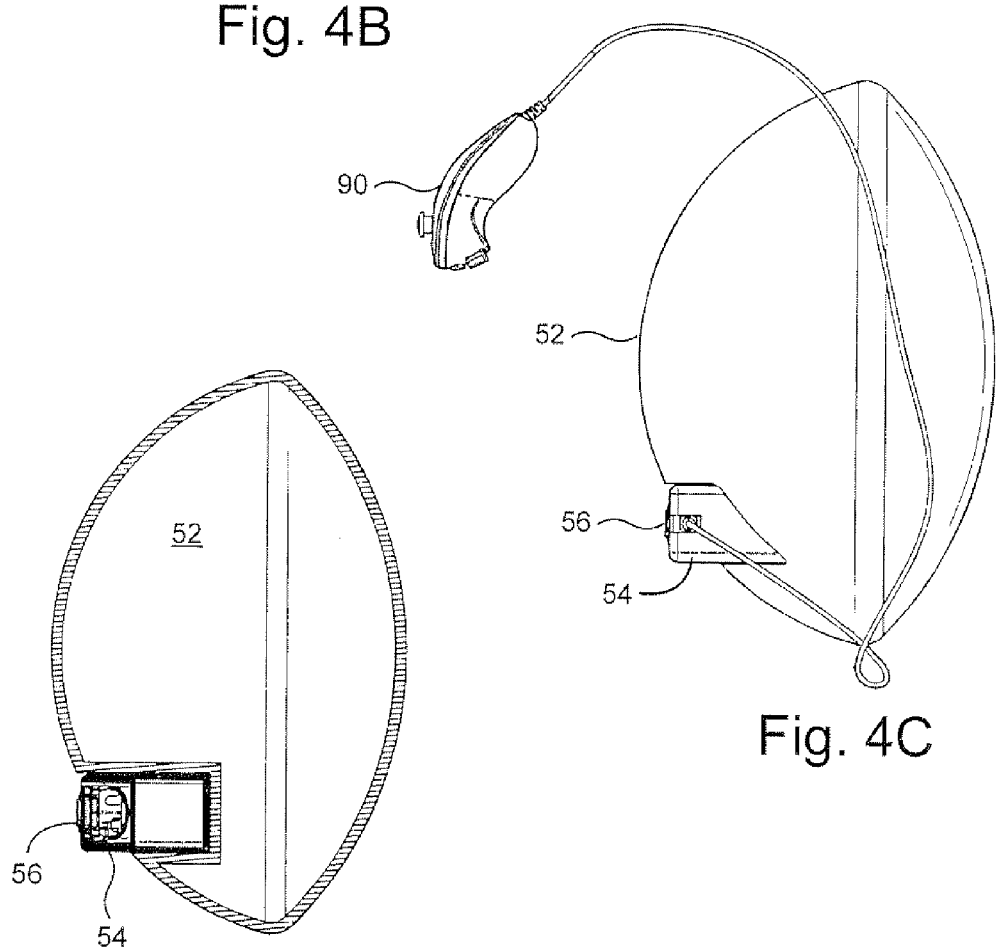
Fig. 4C
Fig. 4D

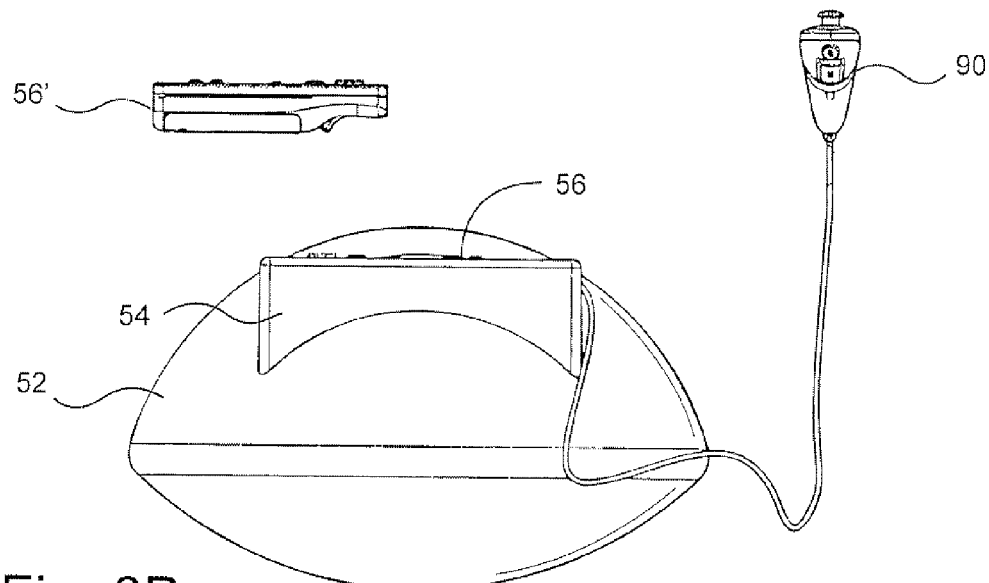
Fig. 6B
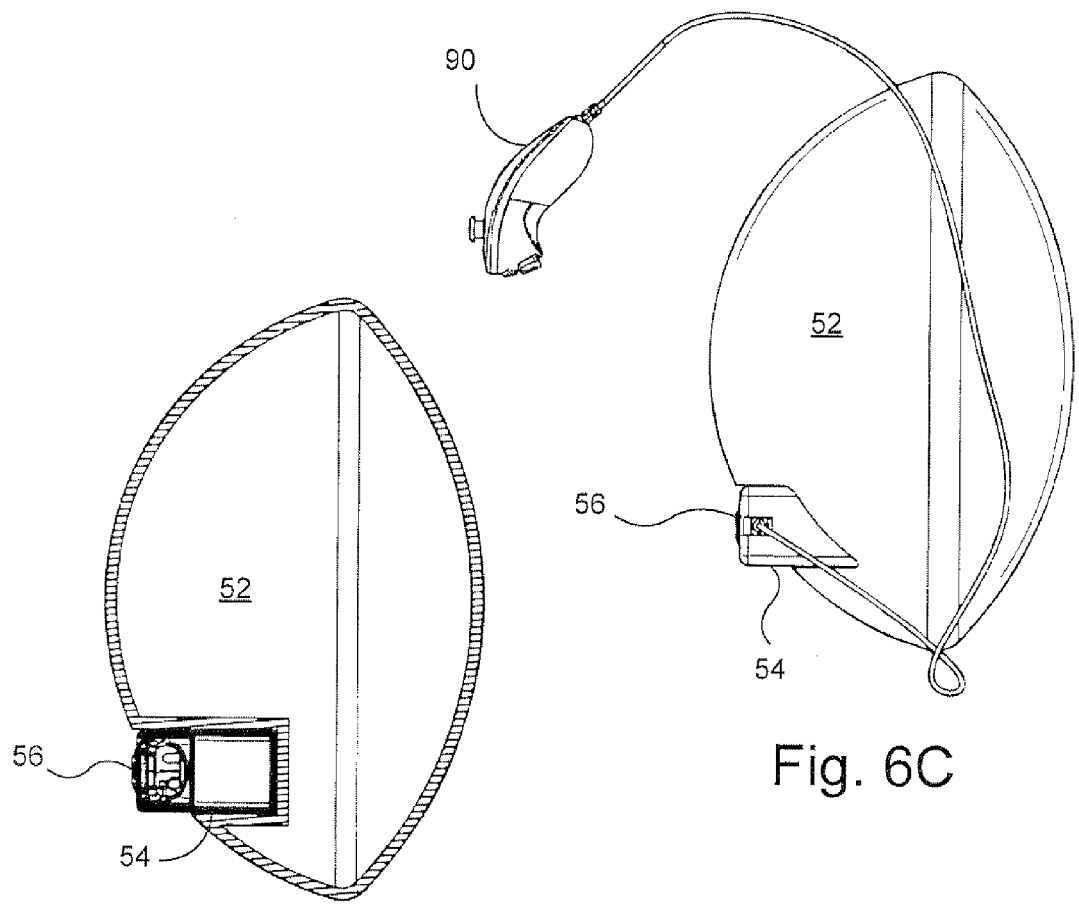
Fig. 6C
Fig. 6D

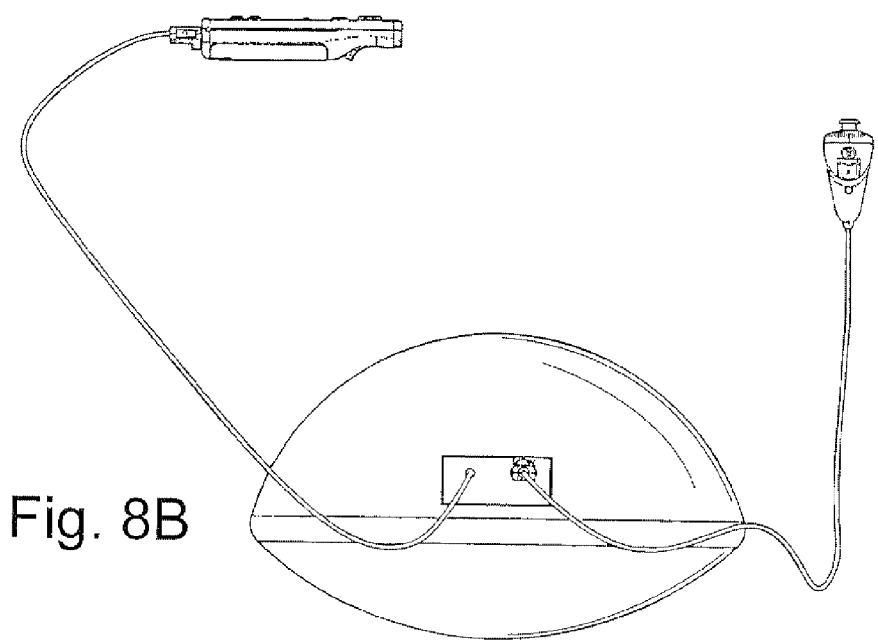
Fig. 8B
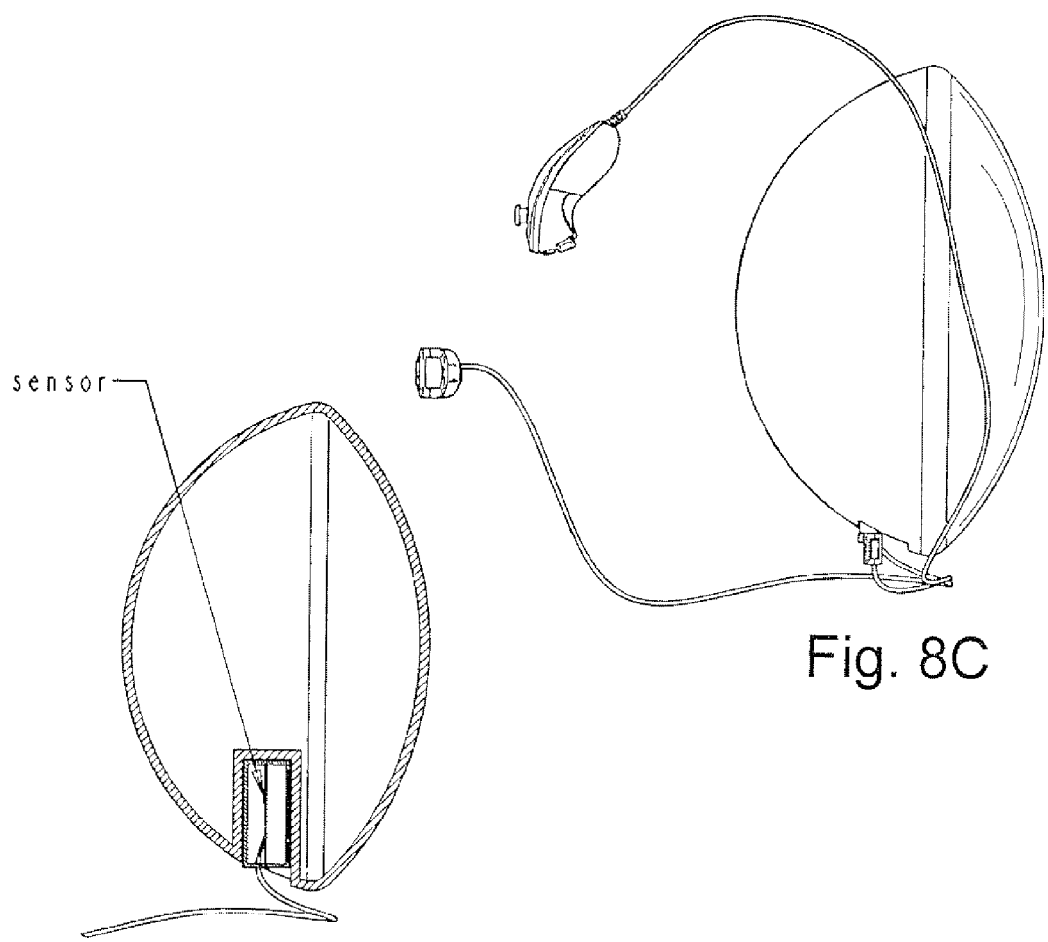
sensor
Fig. 8C
Fig. 8D

HORSEBACK RIDING SIMULATION

CROSS-REFERENCES TO RELATED APPLICATIONS

This application claims the benefit of priority from provisional application No. 61/021,198 filed Jan. 15, 2008, the contents of which are incorporated herein by reference.

STATEMENT REGARDING FEDERALLY SPONSORED RESEARCH OR DEVELOPMENT

Not applicable.

TECHNICAL FIELD

The technology herein relates to input devices for computer graphics based simulations, and to video game play for simulating riding of a horse or other animal.

BACKGROUND AND SUMMARY

For centuries throughout the world, horseback riding has captured the imagination of adventurous people. In the time of the ancient Greeks and Romans, the horse was a symbol of power. In medieval Europe and Japan, horses were essential for quick movement across large distances and were often used in warfare. In the American wild west, the horse was a cowboy's constant companion and a symbol of self-reliance and adventure.

While few experiences may compare with the fun and excitement an experienced rider has galloping a real horse, many of us do not have sufficient training and experience and/or ready access to live horses. Horse riding simulations have therefore always been popular. Carousels ("merry-go-rounds") often have full sized horse models that move up and down to allow riders to feel as if they are riding real horses. Small children sit on small rocking or toy spring horses that move back and forth to simulate horse movements. Some have attempted more elaborate riding simulations using full-sized horse models or mechanical bulls that are instrumented and driven by motors and other electronic devices. Others have constructed full-sized models of the rump, back and wither portions of a horse or similar portions of other animals for use in arcade games, exercise machines, riding trainers or other simulations.

Physical size is a significant problem with such prior designs. To be realistic and useful by older children and adults, the model's dimensions generally need to approximate the size of a real animal. Of course, most of us prefer not to have a full-sized model of a large animal in our living room or den. Inflatable toy horses are known but typically have been used as swimming pool toys which do not provide a very realistic riding simulation.

It would be desirable to provide an inexpensive, convenient way to realistically simulate, in the home, riding on horseback or on other animals.

The exemplary illustrative non-limiting technology herein provides an inflatable air cushion or other type seat a person can sit on. The seat is instrumented with electronic input devices that can sense motion of the seat and/or motion of the person's body. Such input devices provide inputs to a computer graphics system that dynamically generates a responsive scene on a real time display.

One exemplary illustrative non-limiting implementation uses known inputs devices such as the Wii Remote or Nunchuk manufactured by Nintendo. The seat can be provided with a pocket or other mounting mechanism for retaining the Wii Remote. Accelerometers within the Wii Remote or Nunchuk can sense motion of the seat and provide inputs to a Wii video game system. The Wii video game system can provide a realistic display that responds to the Wii remote inputs and allows the user to feel as if he or she is riding a real horse or other animal.

In an exemplary illustrative non-limiting implementation, the instrumented seat can provide feedback to portions of the user's body that are in contact with the seat. For example, the user's balance on the seat can be sensed and result in vibration or other haptic feedback transmitted through the seat to the user's body. In other exemplary illustrative non-limiting implementations, user feedback can be provided through an interactive 3D computer graphics display that responds with tilt, pan, roll, zoom or other graphics image transformations.

In exemplary illustrative non-limiting implementations, one input device can be provided to monitor the motion of the seat and another input device can be provided for the user to hold in his or her hand. In such simulations, the handheld input device can be used for example to simulate holding the reins, while the seat-coupled input device can monitor the motion or balance of the simulated horse or other animal and/or provide haptic feedback.

In other exemplary illustrative non-limiting implementations, one input device can be provided to monitor the motion of the seat, another input device can be provided for the user to hold in his or her left hand, and a further input device can be provided for the user to hold in his or her right hand. In such simulations, one handheld input device can be used to simulate holding the reins, another handheld input device can be used to simulate holding a riding crop, and the seat-coupled input device can monitor the motion or balance of the simulated horse or other animal and/or provide haptic feedback. The second handheld input device can alternatively be used to simulate other actions (e.g., a raised hand for balance as in Bronco riding, a lasso, a sword or other weapon, etc.)

BRIEF DESCRIPTION OF THE DRAWINGS

These and other features and advantages will be better and more completely understood by referring to the following detailed description of exemplary non-limiting illustrative embodiments in conjunction with the drawings of which:

FIGS. 4A-4D shows different views of the FIG. 3 cushion and input devices;

FIGS. 6A-6D show different views of the FIG. 5 cushion and input devices;

FIGS. 8A-8D show different views of the FIG. 7 cushion and input devices;

DETAILED DESCRIPTION

Figure 1:
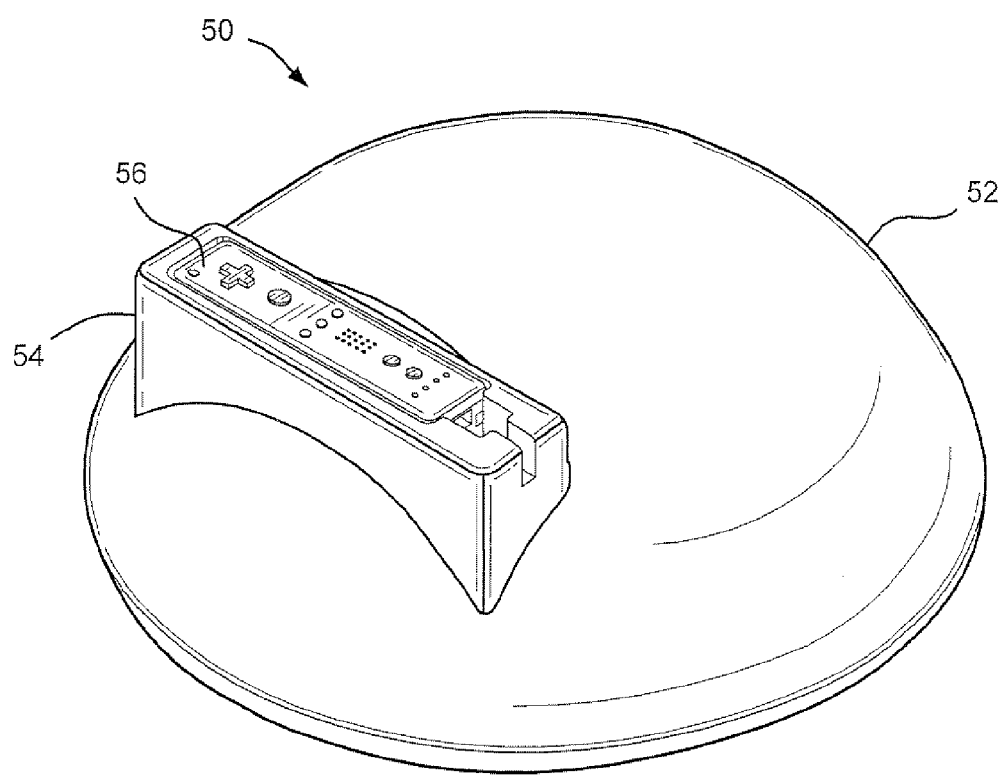
FIG. 1 shows an example illustrative non-limiting seat cushion and associated input device.

FIG. 1 shows an exemplary illustrative non-limiting input accessory device 50 for a computer graphics system such as but not limited to a home video game system. Accessory device 50 includes a cushion 52 and a mounting structure 54. Mounting structure 54 in the exemplary illustrative implementation shown in designed to accept and hold a Wii Remote 56 manufactured by Nintendo. Movement of the player riding on cushion 52 is sensed by the three-axis accelerometer within the Wii Remote 56.

Figure 1A:
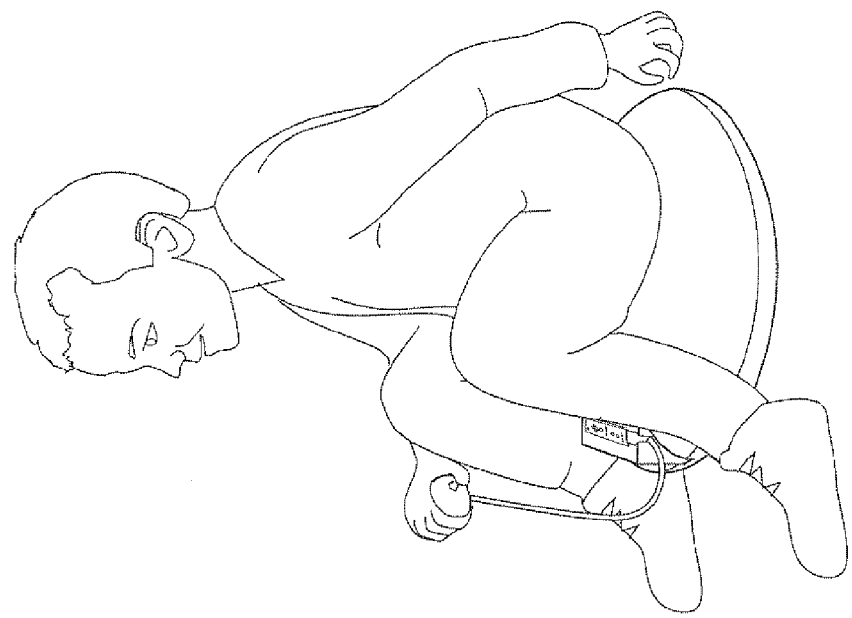
FIG. 1A shows an example system using the FIG. 1 cushion and input device to provide a horseback riding simulation.
Figure 1A:
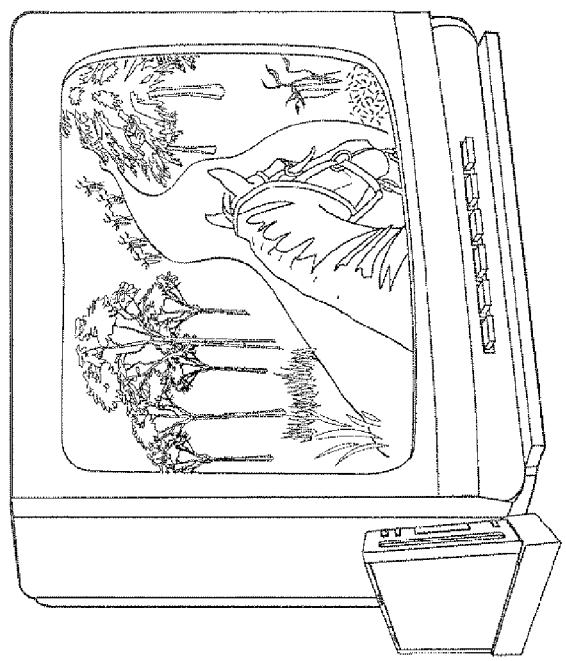
Figure 2:
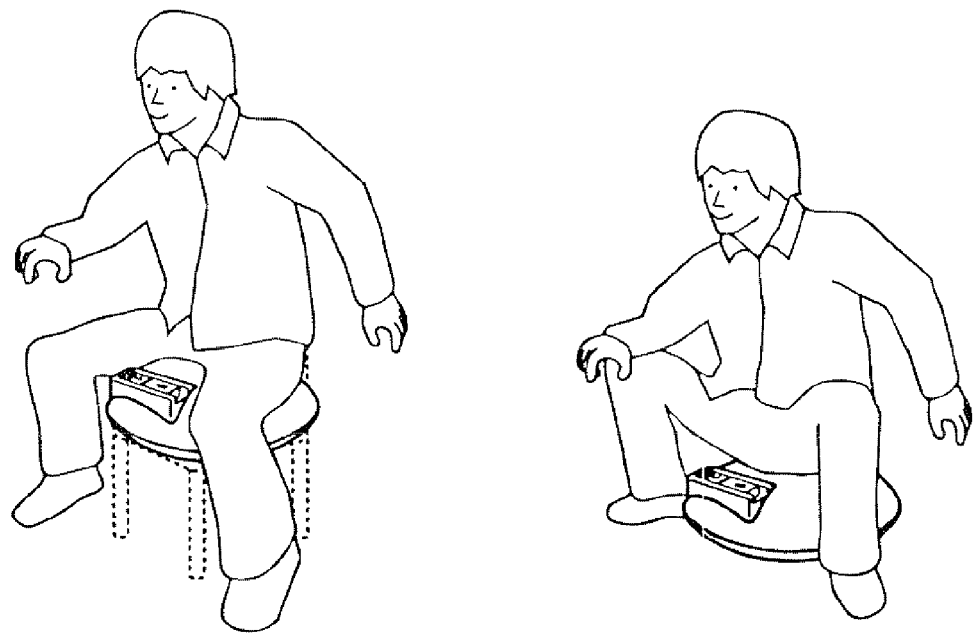
FIG. 2 is shows exemplary illustrative usage of the FIG. 1 cushion.

As shown in FIGS. 1A and 2, the user can sit on cushion 52. Movement of cushion 52 is sensed by the Wii Remote 56. The Wii remote 56 wirelessly sends information concerning this sensed movement to a Wii video game system 58 or other computer graphics display system. System 58 generates a responsive real time 3D image which it displays on display 60. The image simulates what the user would see if he or she were riding a real horse. System 58 dynamically changes the displayed image in real time response to sensed movement of cushion 52.

As shown in FIGS. 2A-2D, cushion 52 may comprise an inflatable, foam or other seat. One exemplary illustrative non-limiting implementation provides cushion 52 made of a hollow inflatable structure comprising PVC, ATBC or other suitable material. A one-way air valve of conventional design may be provided to allow the user to inflate cushion 52. Construction may be similar to that of conventional inflatable exercise balls. An advantage of an inflatable design is that it is compact to ship and store. However, in other non-limiting implementations, cushion 52 may be made of foam or any other conventional material that cushions are typically made of.

The cushion 52 shown is circular in plan view (see FIG. 2A) but has a flattened (elliptical) dome-shaped upper portion 72 and a flattened dome-shaped lower portion 74. Dome-shaped lower portion 74 allows the cushion 52 to be supported on a surface (see FIG. 2) in such a way that it can tilt in any direction of 360 degrees (e.g., from side to side, forward and backward, etc.). Dome-shaped upper portion 72 provides a resting place for the user's buttocks (see FIG. 2) while giving the user a challenge to balance his body on the cushion 52. Other exemplary illustrative non-limiting cushion 52 designs could have other geometric shapes such as spherical or cylindrical, could be shaped as a saddle, or the like.

Figure 2A:
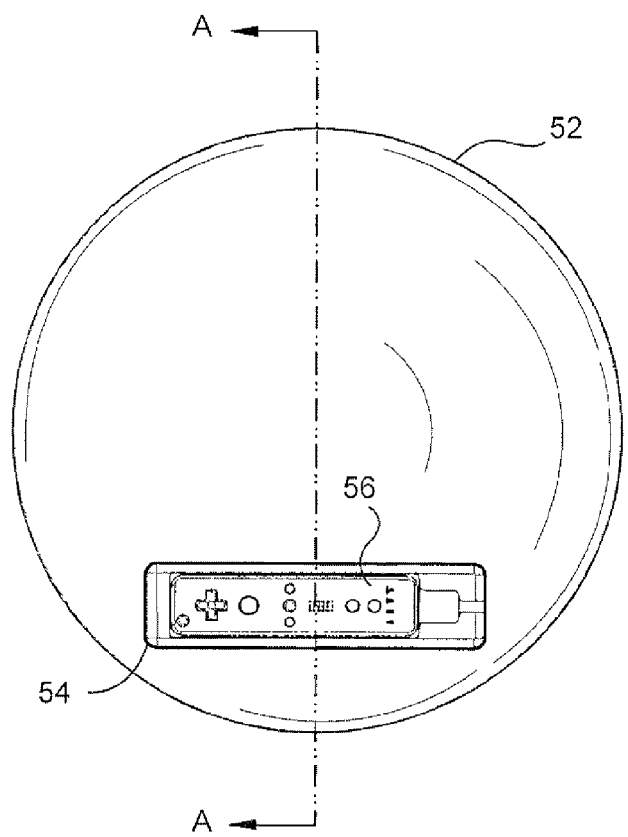
FIGS. 2A-2D show different views of the FIG. 1 cushion.
Figure 2B:
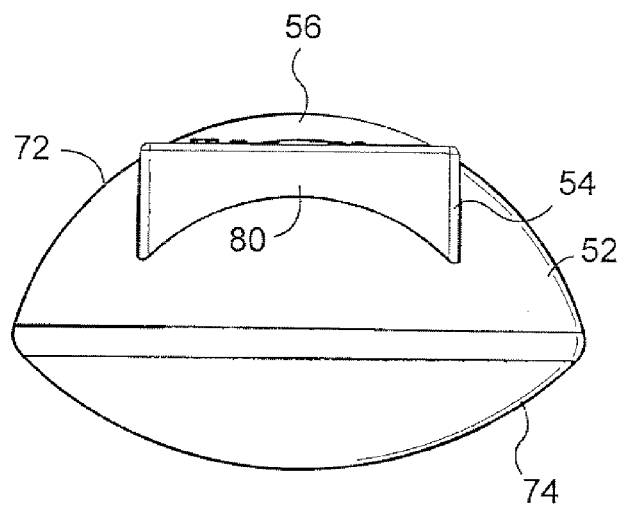
Figure 2C:
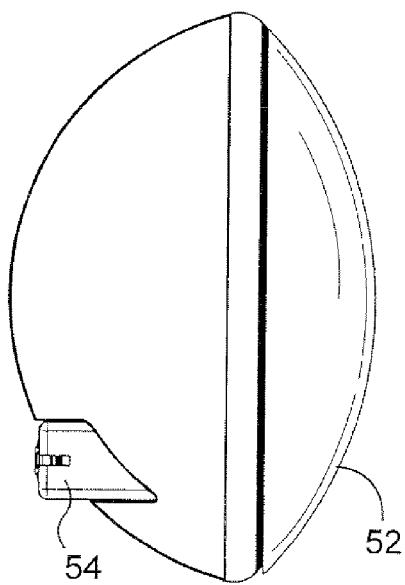
Figure 2D:
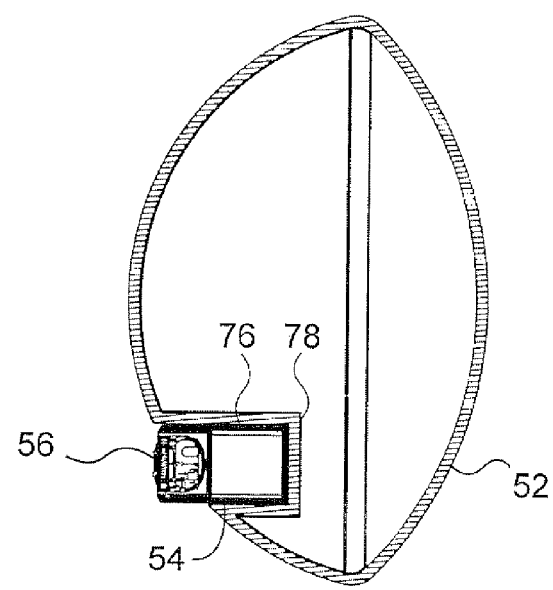

The exemplary illustrative design shown in FIGS. 2A-2D includes mounting structure 54 for accepting a Wii Remote 56. Mounting structure 54 in one exemplary illustrative non-limiting implementation comprises a hard plastic housing 76 that is retained within a channel 78 defined in the outer surface of the cushion's dome-shaped upper portion 72. Mounting structure hard plastic housing 76 may be generally rectangular, hollow and dimensioned to snugly accept and retain a Wii Remote 56. As shown in FIGS. 2 and 2A, the mounting structure housing 54 is anchored to cushion 52 in an orientation such that the Wii Remote 56 installed therein is parallel to and spaced away from the front of the user's body. Such orientation allows full sensing of X, Y and Z accelerations due to movement of the player on cushion 52 without exposing the Wii Remote to damage or requiring the player to sit on the Wii Remote. As shown in FIG. 2B, a portion 80 of the housing 76 may be curved to conform with the outer profile of cushion 52. Alternative techniques for mounting the Wii remote 56 on or in cushion 52 are possible, as are alternative orientations of the Wii Remote 56 with respect to the player and/or the cushion 52.

In the implementation shown in FIG. 1, the Wii Remote 56 can be inserted into housing 54 when it is desired to use the Wii Remote with the accessory 50. The Wii Remote 56 can be removed from housing 54 when it is desired to play games that do not involve using the accessory 50. Such removability is not required but is advantageous in this particular exemplary implementation (see discussion below for sensors that may be permanently built into cushion 52).

Figure 2E:
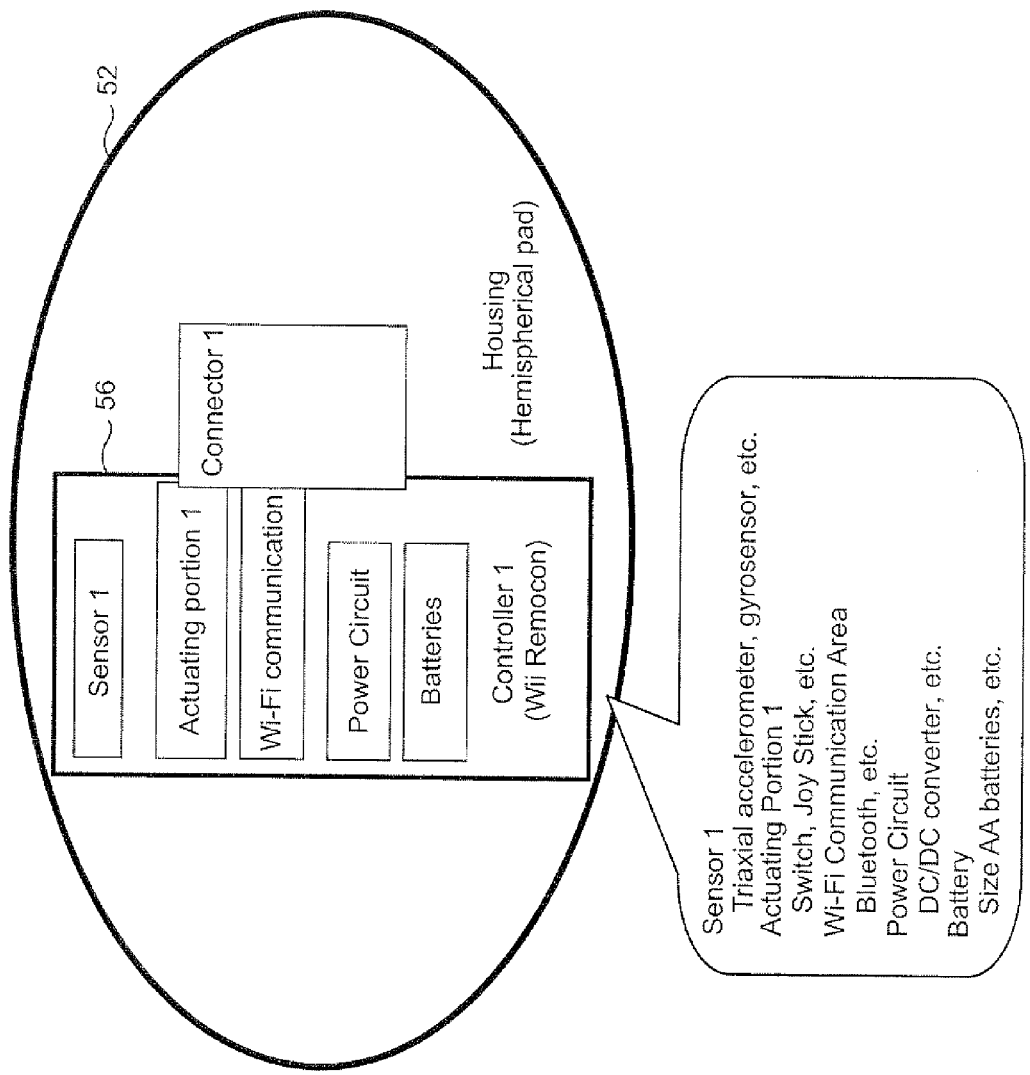
FIG. 2E shows a block diagram of the exemplary illustrative non-limiting FIG. 1 input device.
Figure 9A:
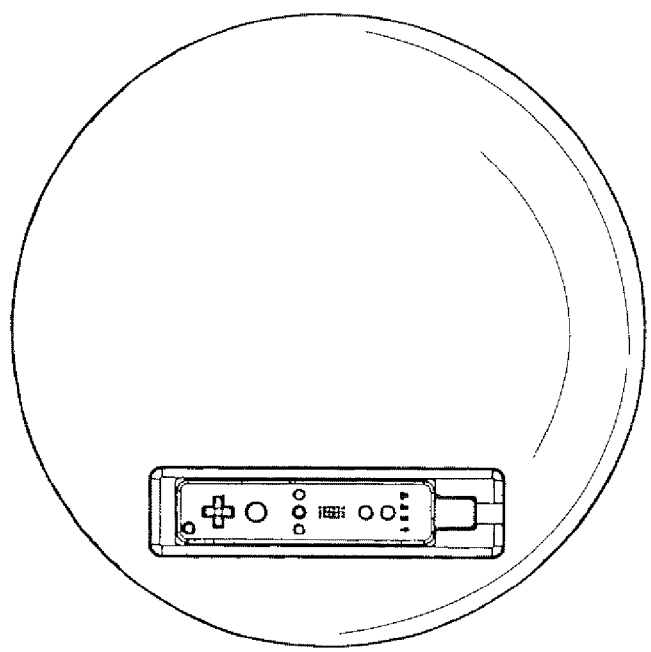
FIG. 9A-9D show exemplary illustrative non-limiting ways in which motion of an exemplary illustrative non-limiting cushion as shown in the other Figures mentioned above can be sensed.
Figure 9B:
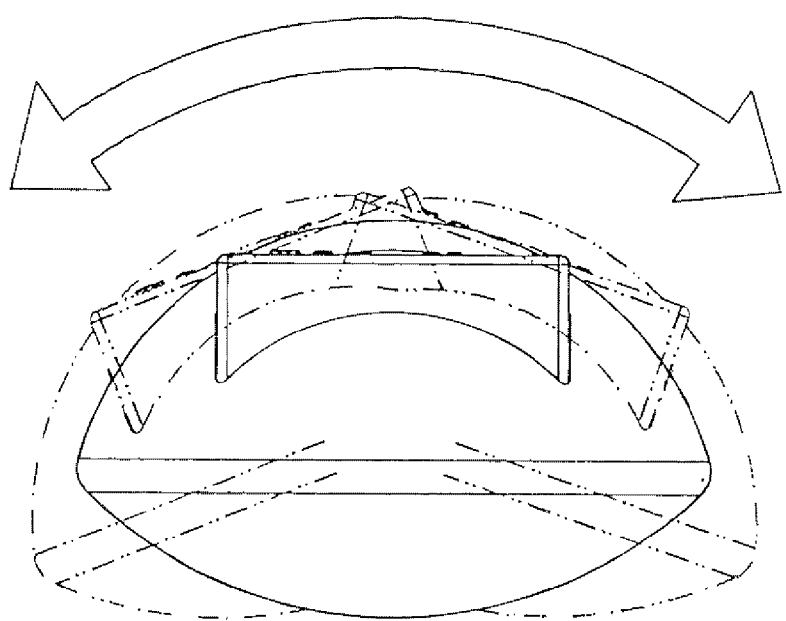
Figure 9C:
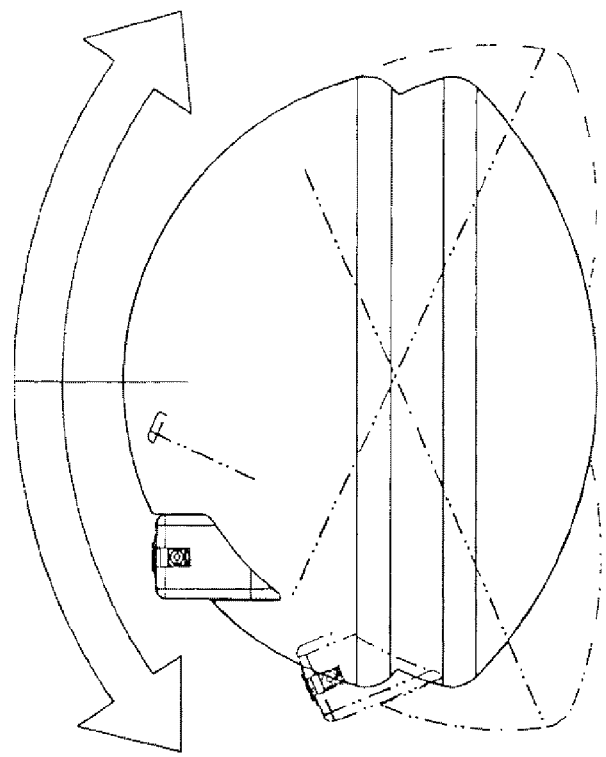
Figure 9D:
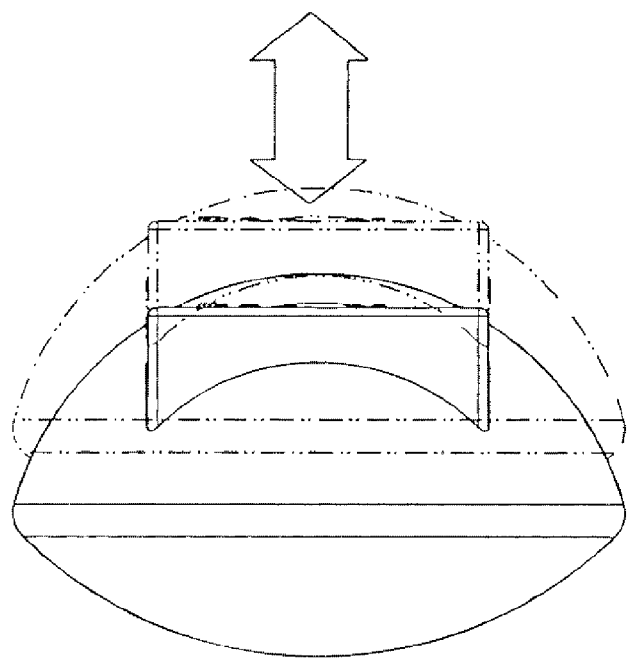

In use, the user sits on cushion 52 and balances himself or herself on the cushion. As the user moves his body from side to side, back and forth and up and down, accelerometers within the Wii Remote 56 (see FIG. 2E) sense the user's motion and send signals back to the Wii main unit. The Wii main unit generates a responsive 3D video display that adds further realism to the simulation. For example, the Wii main unit can display the back of a horse's head and background of a trail, a field, a battlefield or other environment the virtual horse is being ridden through (see FIG. 1A). The image may change in response to detected motion of the user. For example, the rate of forward/backward rocking as sensed by the Wii Remote 56 (see FIGS. 9A, 9B) can control the gait of the virtual horse being simulated on the display. The Wii Remote 56 can detect when the user leans forward or leans backward in the virtual saddle provided by cushion 52 (see FIG. 9C) and adjust the image appropriately. The Wii Remote 56 can detect when the player moves up and down in the virtual saddle provided by cushion 52 (see FIG. 9D), and provide responsive behavior by the virtual horse and/or other user interaction with the virtual scene.

Usage of the FIG. 1 exemplary illustrative non-limiting implementation is not limited to horseback riding simulations. For example, accessory 50 could be used to simulate riding of other real world animals such as bulls, camels, elephants, burros, dolphins, whales or the like. It could be used to simulate riding of imaginary creatures such as dragons, griffons, unicorns, giant eagles, or the like. It could be used to simulate riding of vehicles such as a hang gliders or other aircraft, a magic carpet, a motorcycle, a jet-ski, a land or sea exploration vehicles or the like. It could be used to simulate sky diving or swimming. The possibilities for such simulations are limited only by the imagination of the developer of the video game or other simulation software.

Figure 3:
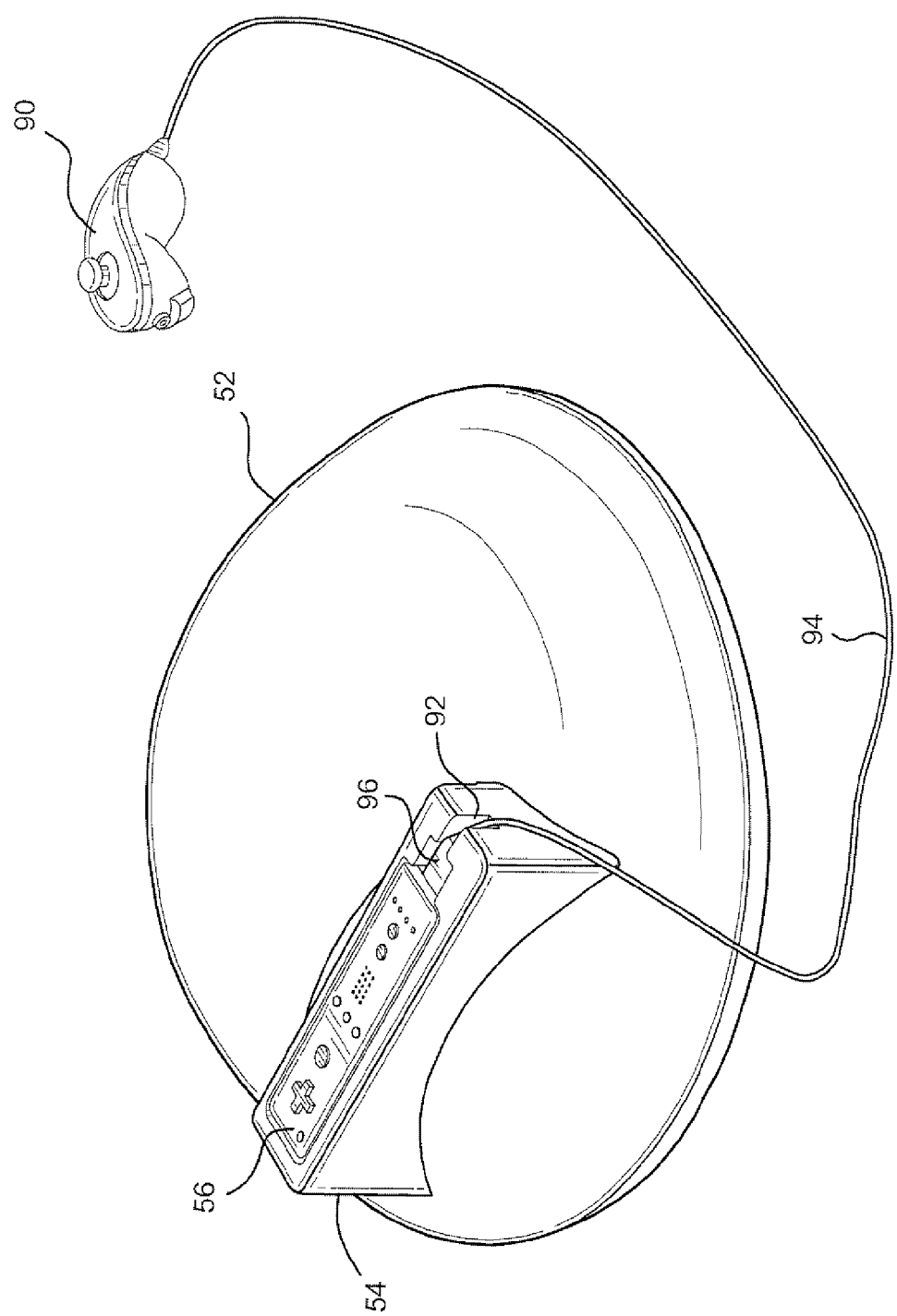
FIG. 3 shows another exemplary illustrative non-limiting cushion with two separate input devices.
Figure 4:
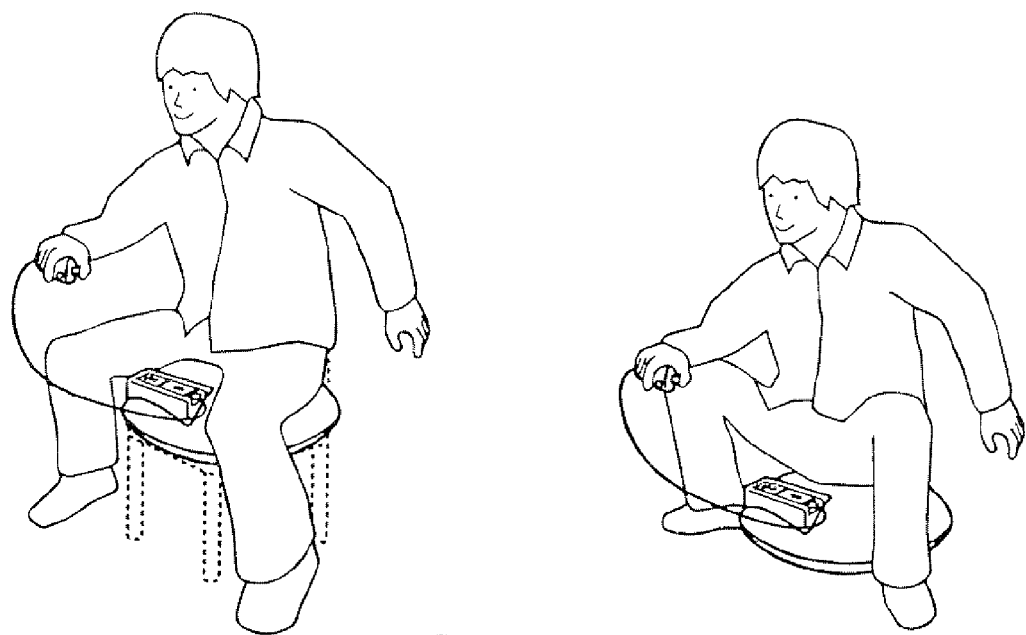
FIG. 4 shows exemplary illustrative usage of the FIG. 3 cushion and input devices.
Figure 4A:
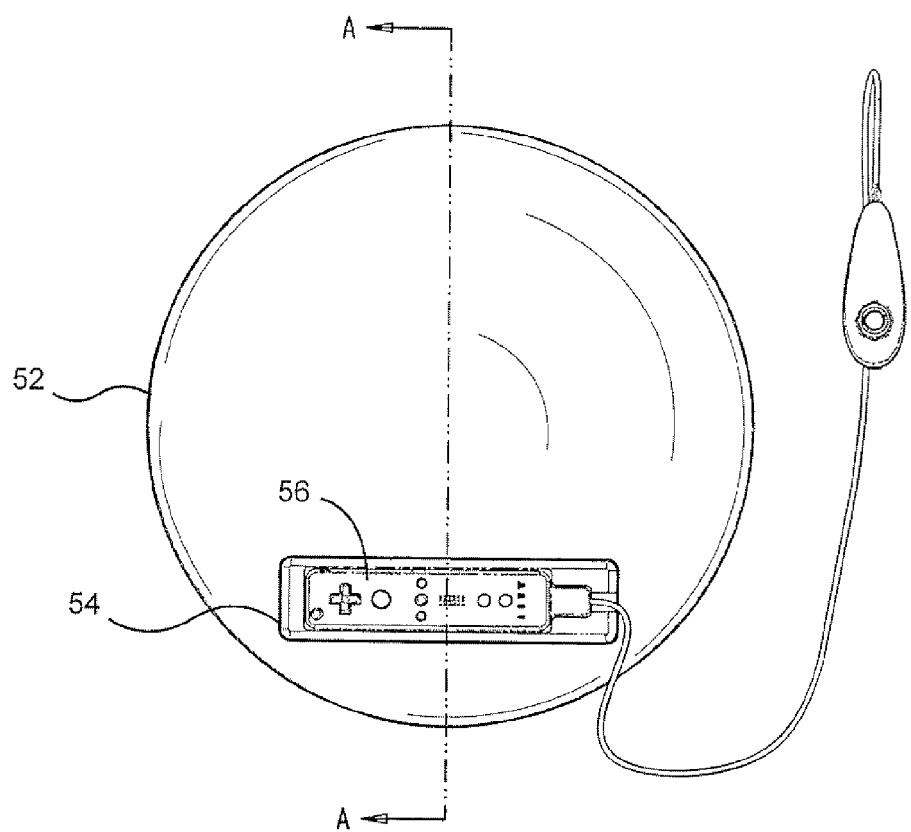
Figure 4E:
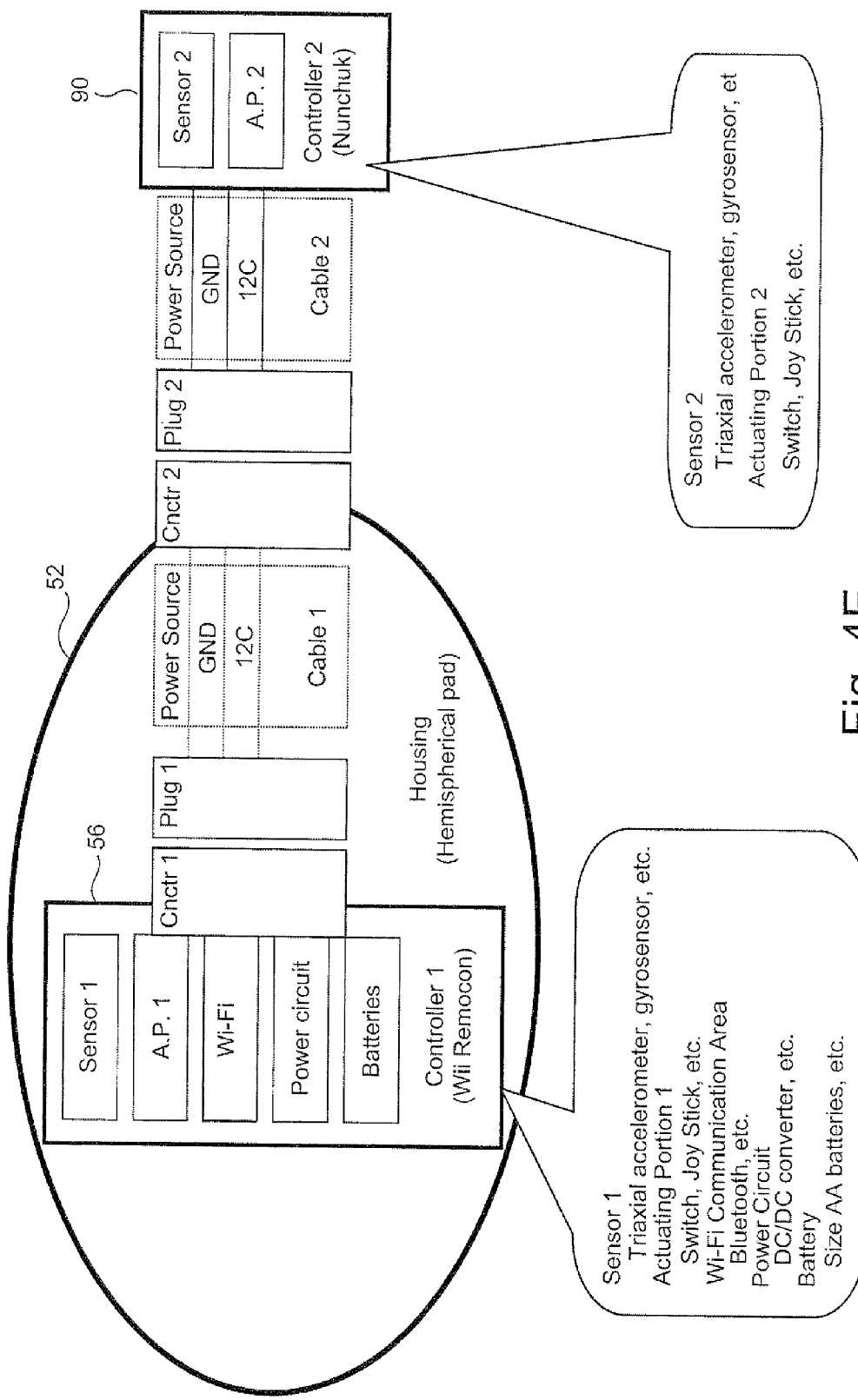
FIG. 4E shows a block diagram of the exemplary illustrative non-limiting FIG. 4 input devices.

When actually riding a horse, it is typical for the rider to hold the reins in one or both hands (depending on whether the rider is riding Western style or English style). In a further exemplary illustrative non-limiting implementation shown in FIG. 3, a Wii Nunchuk 90 is plugged into the Wii Remote 56 in a conventional way. Note that in the implementation shown, housing 54 is formed with a slot 92 that allows the cable 94 of Nunchuk 90 to exit the housing and also provides sufficient clearance to accommodate the Nunchuk connector 96. See also FIGS. 4A-4D. FIG. 4E shows a (conventional) interconnection between the Wii Remote 56 and the Nunchuk As shown in FIG. 4, the user may hold the Nunchuk 90 in one hand while sitting and balancing on cushion 52. Movement of the player continues to be sensed by the Wii Remote 56 attached to riding cushion 52. The Nunchuk 90 can be used to simulate the reins, to simulate a lasso (e.g., for throwing a rope to catch an errant cow), to simulate a weapon such as a sword or a pistol, or for other purposes.

Figure 5:
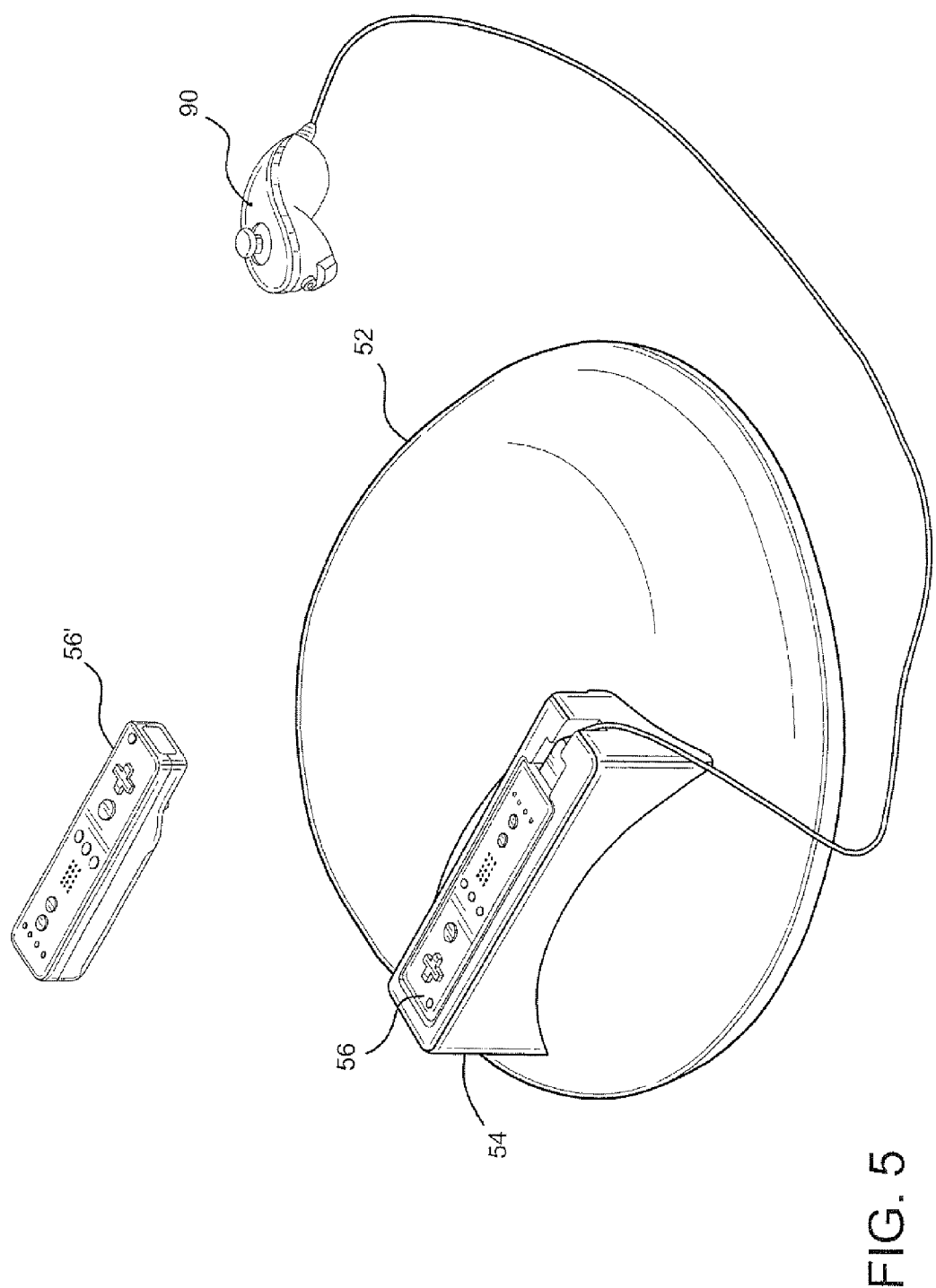
FIG. 5 shows another exemplary illustrative non-limiting cushion with three separate input devices.
Figure 6:
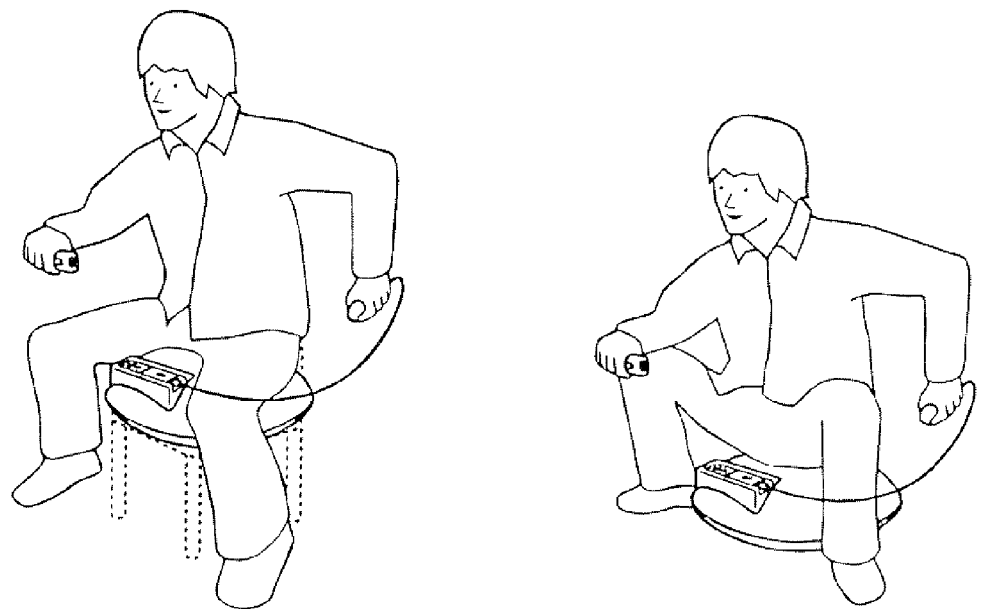
FIG. 6 shows exemplary illustrative usage of the FIG. 5 cushion and input devices.
Figure 6A:
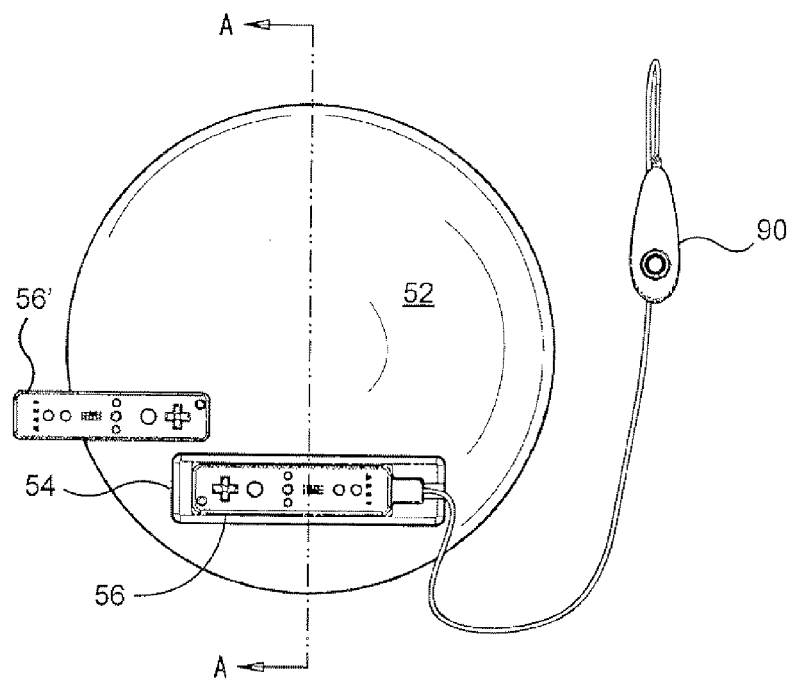
Figure 6E:
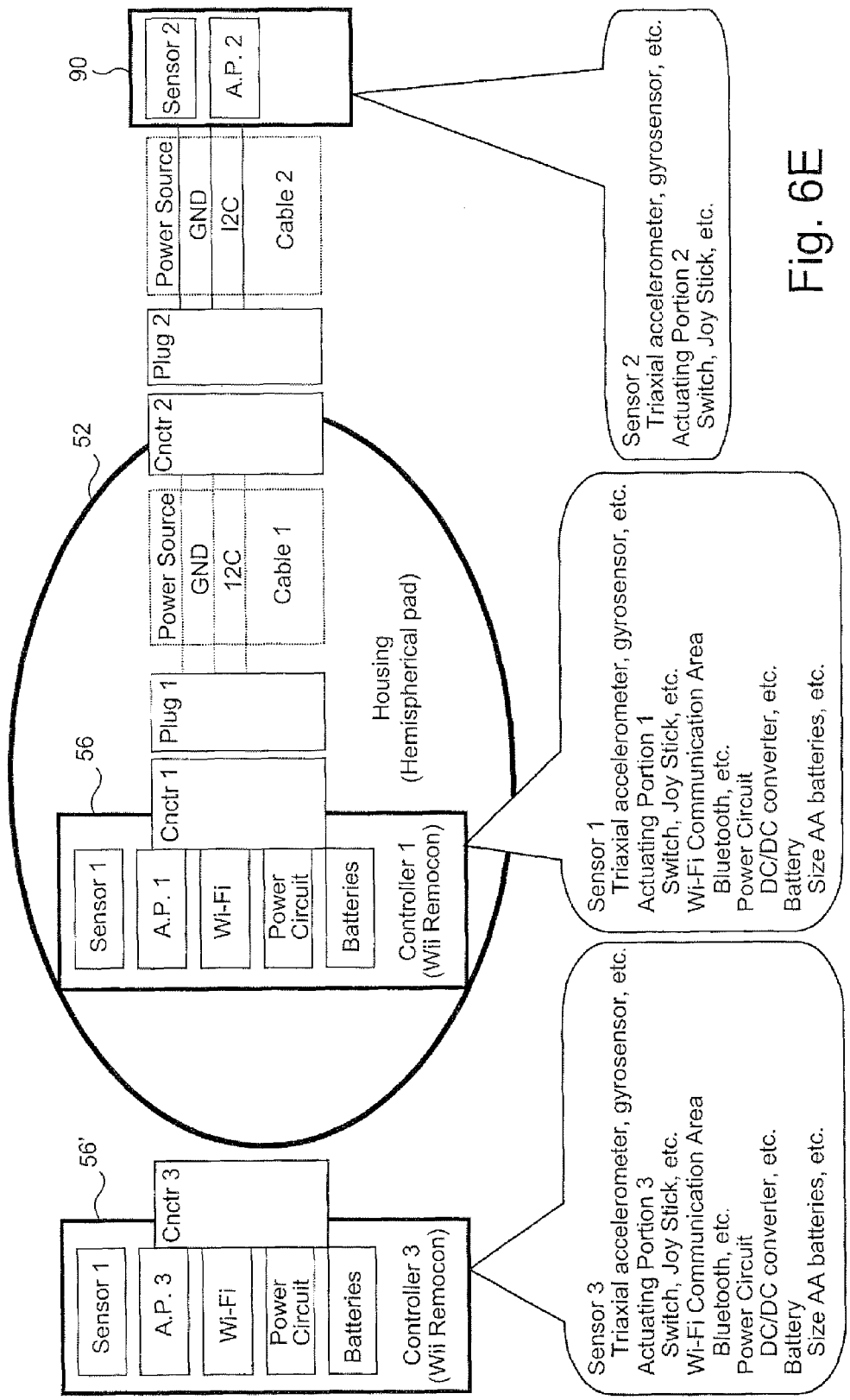
FIG. 6E shows a block diagram of the exemplary illustrative non-limiting FIG. 5 input devices.

FIG. 5 shows an additional expanded illustrative non-limiting implementation employing Wii Remote 56 to monitor motion of cushion 52, the Nunchuk 90 to monitor motion of one hand, and an additional Wii Remote 56' to monitor motion of the other hand. FIGS. 6A-6D show additional details, and FIG. 6E shows an example block diagram. FIG. 6 shows example usage. In one possible scenario, the Nunchuk 90 can be used to simulate a lasso and the second Wii remote 56' can be used to simulate holding the reins. Other examples include one hand holding the reins and another hand holding a riding crop, a weapon, or the like. In other types of simulations, the Nunchuk 90 and additional Wii Remote 56' could be used to simulate manipulating controls of a vehicle; signaling devices such as flags; weapons such as lances, swords, rifles or other firearms; or any other graspable real or imaginary object.

In English style riding of a horse, it is conventional to hold the reins with both hands. In a further exemplary illustrative non-limiting implementation, system 50 could be provided for operation with two Wii Remotes 56, 56' and no Nunchuk 90. The first Wii remote 56 could be mounted within cushion housing 54 as shown, and the second Wii Remote 56' could be in both hands parallel to the chest, thus simulating holding the reins with two hands. Pulling back on the right side of the second Wii Remote 56' could cause the virtual horse being simulated to turn to the right. Similarly, pulling back on the left side of the second Wii Remote 56' could cause the virtual horse to turn to the left. Pulling back on both right and left sides of the second Wii Remote 56' could cause the virtual horse to stop. Sensing certain vibrations (e.g., due to pulsing of the knees against cushion 52) could prompt the virtual horse to begin moving. Those skilled in horsemanship understand that there are a number of movement commands one may give a horse. Any or all such commands can be simulated as discussed above. In a further exemplary illustrative non-limiting implementation, a microphone is additionally provided to accept and decode voice commands (e.g., "whoa", "cluck-cluck" etc.) thereby providing still additional realism.

Yet another possible configuration is for the Wii Remote 56 and the Nunchuk 90 to trade places, with the Nunchuk being disposed in the cushion 52 and the Wii Remote 56 being held in the hand. In this configuration, the accelerometer within Nunchuk 90 is used to sense motion of the cushion 52. Nunchuk 90 is connected by its conventional cable to the handheld Wii Remote 56, which is held by the user and used to sense hand position and acceleration. Wii Remote 56 sends information about what it senses and what the Nunchuk 90 has sensed to the Wii main unit. An advantage of this configuration is that the digital pointing device (DPD) within the Wii Remote 56 is available to sense pointing information using the Nintendo sensor bar for example.

Figure 7:
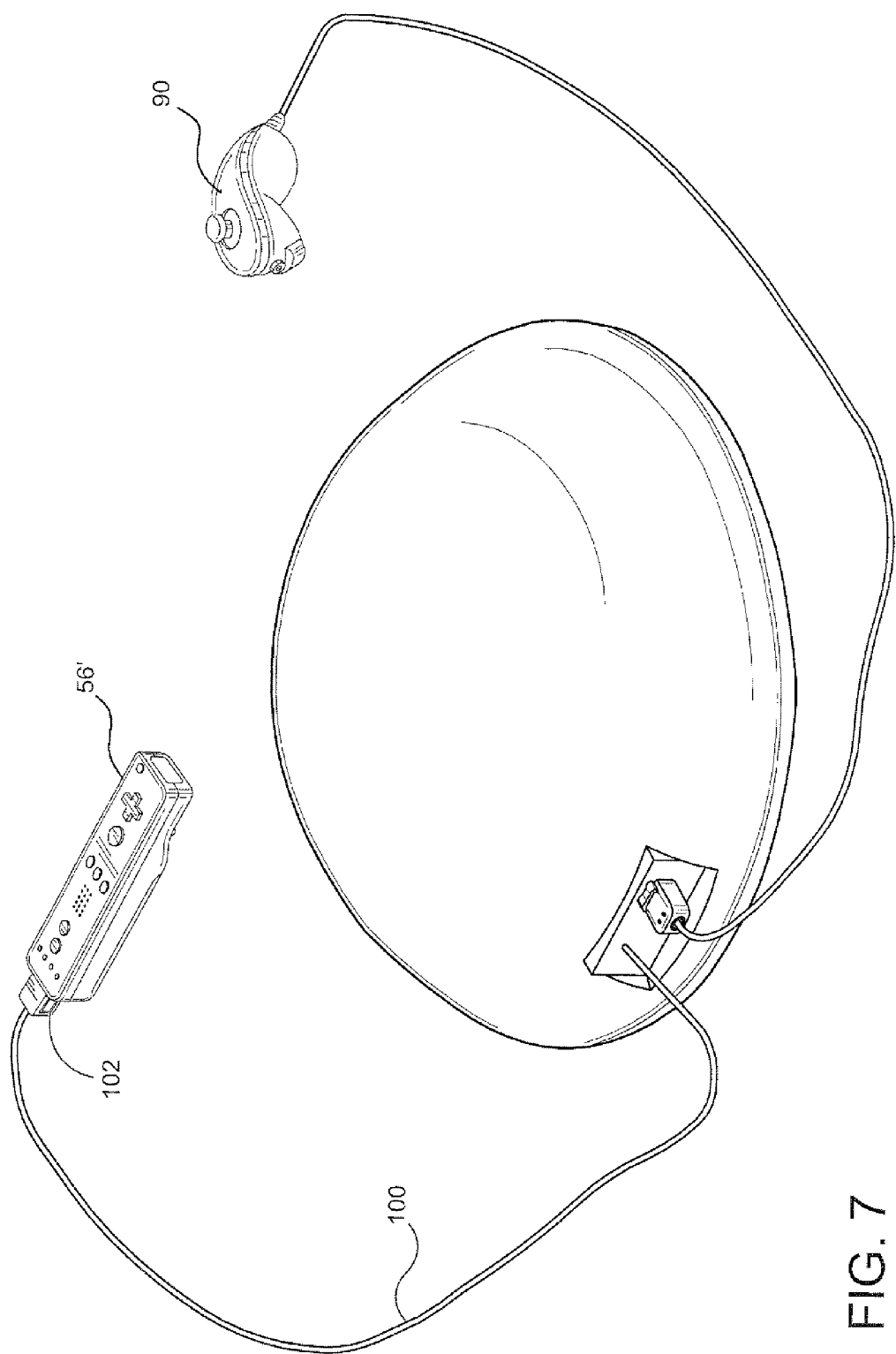
FIG. 7 shows another exemplary illustrative non-limiting cushion with three separate input devices.
Figure 8:
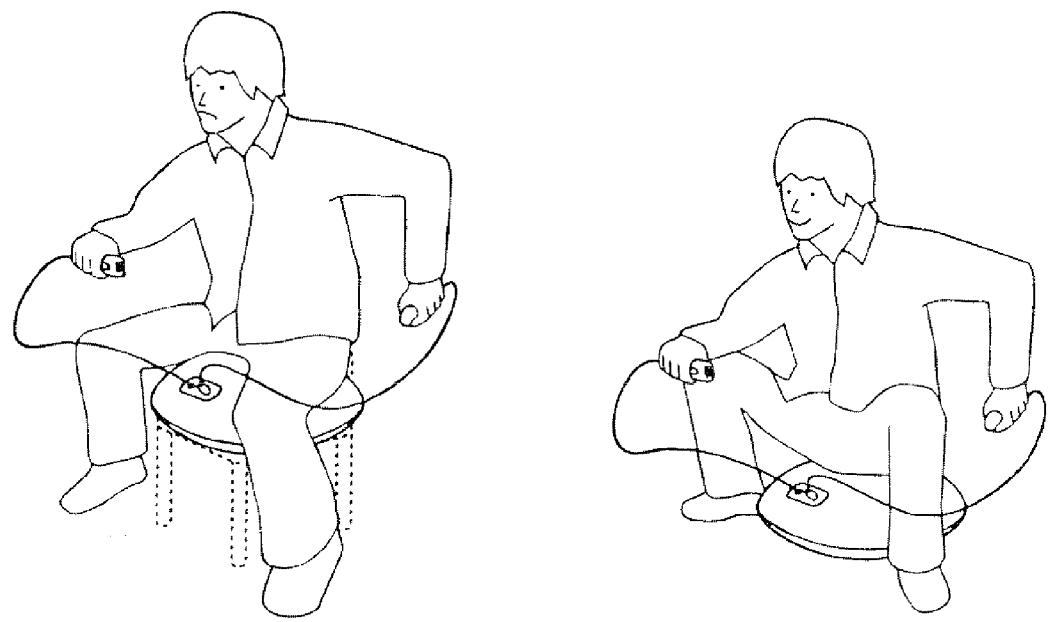
FIG. 8 shows exemplary illustrative non-limiting usage of the FIG. 7 cushion and input devices.
Figure 8A:
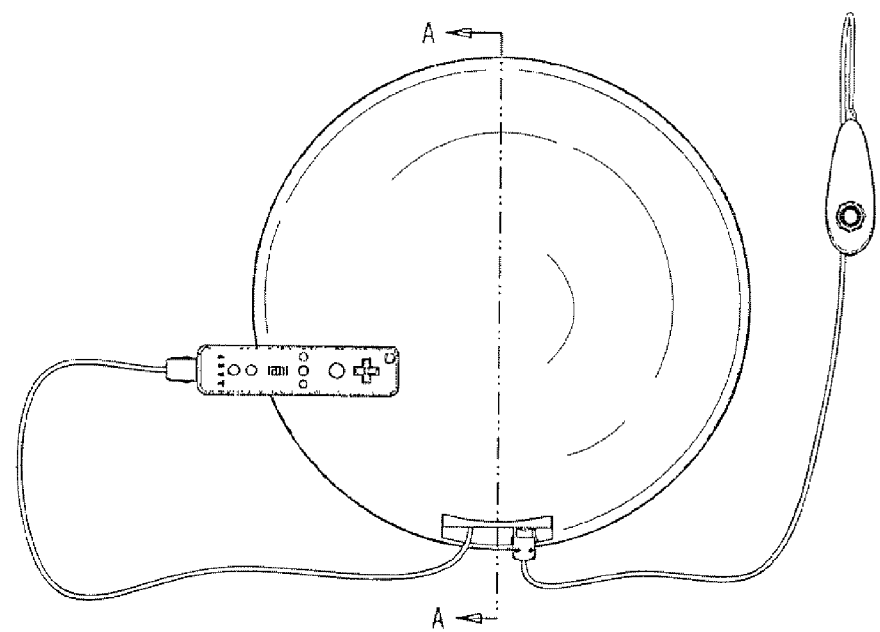
Figure 8E:
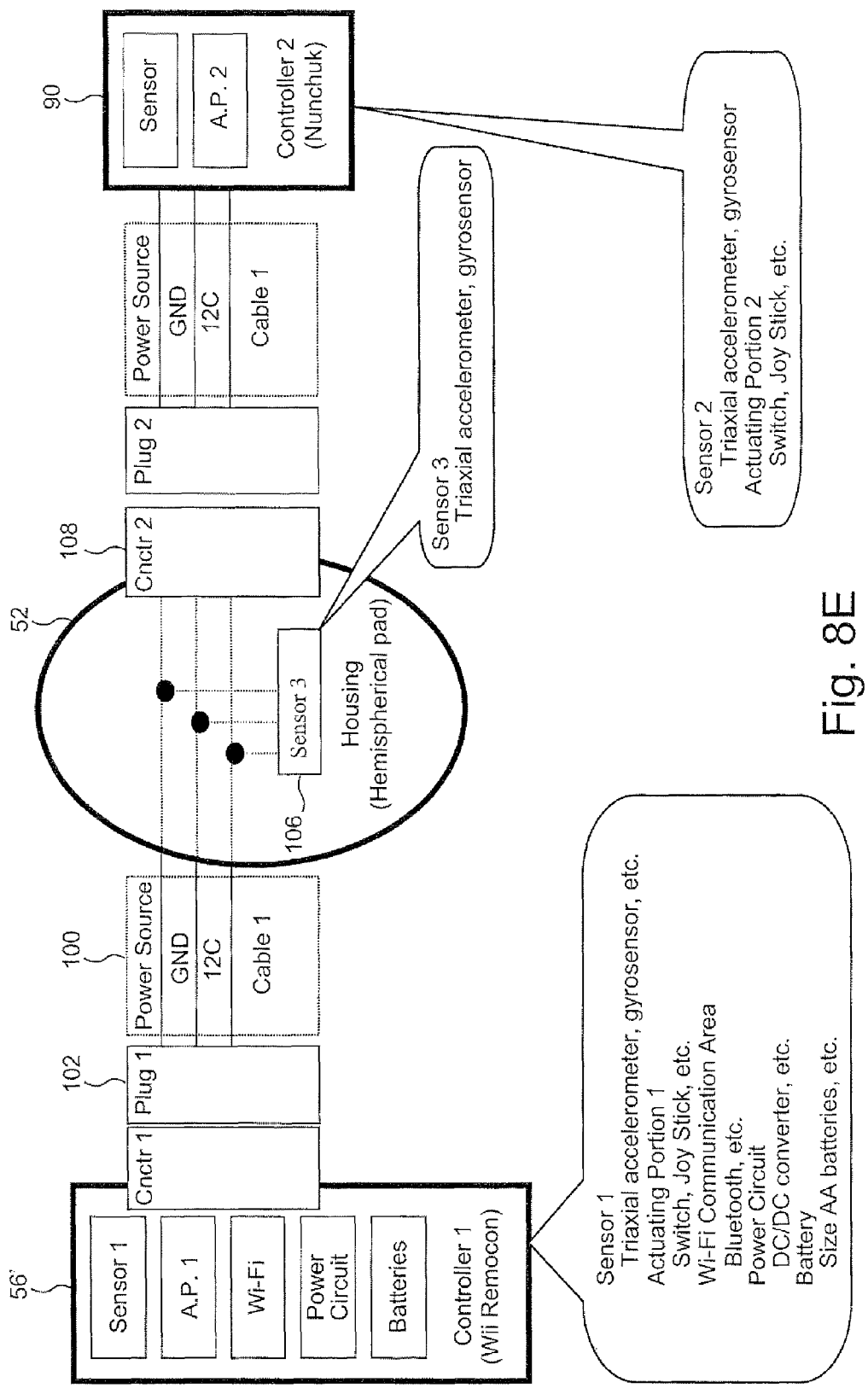
FIG. 8E shows a block diagram of the FIG. 7 exemplary illustrative non-limiting input devices.

FIG. 7 shows an additional exemplary illustrative non-limiting implementation that replaces the Wii Remote 56 with a sensing arrangement that is permanently or otherwise built in to cushion 52. In the implementation shown, a Wii Remote 56' is connected to cushion 52 by a cable 100 and associated connector 102, and if desired the Nunchuk 90 is connected to the cushion 52 by its associated cable and connector. In the example shown, electronics within the cushion 52 communicate with the Wii main unit via the Wii Remote 56' connected to the cushion. FIG. 8 shows that exemplary illustrative non-limiting usage is nearly the same as in FIG. 6. FIG. 8E shows an example block diagram indicating that an additional motion sensor 106 such as a three-axis accelerometer may be permanently or otherwise affixed to cushion 52. Connector 108 disposed within cushion 52 is used to connect with Nunchuk 90, and cable 100 is used to connect with a Wii Remote 56'. Sensor 106 may communicate with Wii Remote 56' over the same I2C bus that the Nunchuk 90 uses to communicate with Wii Remote 56'.

Figure 10:
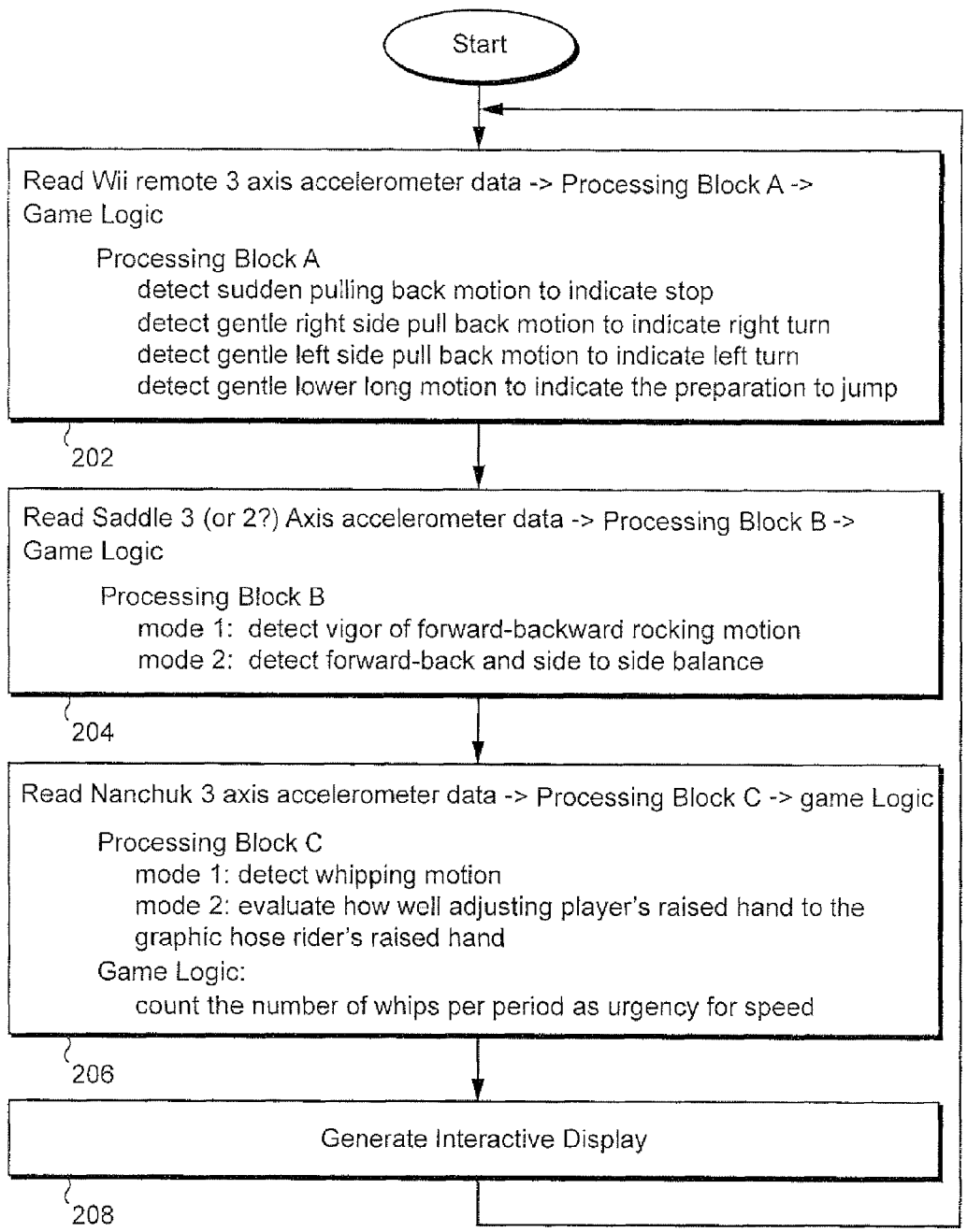
FIG. 10 shows exemplary illustrative non-limiting software processing that can be performed by the system shown in FIG. 1A.

FIG. 10 shows an exemplary illustrative non-limiting processing that may be performed by the Wii main unit under software control. In the particular implementation shown, which example is used with the implementations shown in FIG. 5 or 7, the Wii main unit may read the handheld Wii Remote 56' three-axis accelerometer data and use it to simulate reins. For example, detecting sudden pulling back motion of the handheld Wii Remote 56' indicates the simulated horse should halt, detecting gentle right-side pull back motion indicates a right turn, detecting gentle left side pull back motion indicates a left turn, detecting gentle lower long motion indicates preparation to jump, etc. (block 202). The Wii main unit may read the accelerometer outputs from the Wii Remote 56 coupled to cushion 52 to control gait (e.g., by detected vigor of the player's forward/backward rocking motion) and/or to control image attitude (e.g., by detecting the forward/back and side-to-side balance of the player) (block 204). The Wii main unit may read the accelerometer output of handheld Nunchuk 90 to for example detect a whipping motion of a simulated riding crop (and if desired to count the frequency of whipping motions for use in controlling simulated gait of the horse from walk to canter to gallop), to evaluate how well a player matches gestures indicated on the display through hand motions, to simulate a lasso movement, etc. In this way, one hand holding the Wii Remote 56' horizontally can simulate holding onto the reins to provide directional and stop commands for the horse; the hand holding Nunchuk 90 can simulate a raised hand for balance as in Bronco riding, simulate a riding crop to command faster speed or to provide a lasso simulation; and the rocking motion of cushion 52 can be detected to control the gait of the horse (gentle forward/backward motion=walking, fast forward/backward rocking motion=gallop) and/or to indicate balance (e.g., leaning forward, backward and side to side to input balance). Such balance detection provides a self-made haptic feedback through a part of your body that does not typically receive haptic feedback in a video game.

Configurations other than the ones shown are possible. For example, it would be possible to provide a more extensive cushion type structure with an upwardly extending vertical platform that provides a set of simulated reins that the player can hold. In such case, any desired type of sensor such as a strain or pressure gauge could be used to detect pulling of the reins. Such sensors could be coupled to the Wii Remote 56 for transmission to the Wii main unit. In other configurations, components different from the Wii components described above could be used instead to provide a personal computer or other simulation game.

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:

1. A method of simulating horseback riding comprising:
   (a) providing a cushioning device configured to support a player, the cushioning device having a dome-shaped portion configured to support the cushioning device directly on a surface so that the cushioning device is tiltable with respect to the surface by a player sitting on the cushioning device;
   (b) providing a receptacle on the cushioning device into which a handholdable video game remote control of the type having an acceleration sensor can be removably inserted and retained;
   (c) detecting, with the inserted handholdable video game remote control acceleration sensor, the motion and balance of a player sitting on the cushioning device; and
   (d) in response to said detected motion and balance, using a processor to automatically dynamically generate a 3D graphics display simulating riding a horse.

2. The method of claim 1 wherein said detecting comprises detecting x-y-z acceleration indicative of said motion and balance with a three-axis accelerometer, and wirelessly transmitting said detected x-y-z acceleration to a computer graphics display system comprising said processor.

3. The method of claim 1 further including inflating said cushioning device.

4. The method of claim 1 further including providing a channel as part of the receptacle, and detecting inputs from at least one handheld input device connected to the handheld video game remote control via a cable passing through the channel to simulate reins.

5. The method of claim 1 wherein dynamically generating includes controlling a gait of a simulated horse displayed on the 3D graphics display at least in part in response to said detected motion and balance.

6. A video game accessory for use with a video game system having a processor and a display, comprising:
   an inflatable cushion dimensioned and configured for a user to straddle and sit on, the inflatable cushion including a rounded portion that enables the inflatable cushion to be supported on a surface in such a way that a person seated on the cushion can tilt the cushion in any direction; and
   a mounting structure affixed to said inflatable cushion, said mounting structure being dimensioned to removably accept an elongated handheld remote control device of the type that can sense acceleration due to movement and balance of a person seated on the cushion,
   wherein a processor coupled to said handheld remote control device uses sensed acceleration corresponding to movement and balance of a person seated on said inflatable cushion to change a gait of a displayed simulated virtual animal.

7. A video game accessory comprising:
   an inflatable seat having a structure for accepting and retaining a normally handheld video game remote control, the inflatable seat having a domed lower portion configured to tilt in any of several directions when resting on a surface;
   said handheld video game remote control having therein at least one acceleration sensor, said acceleration sensor being used to detect motion and balance of a player seated on said inflatable seat, the seat having a structure for removably accepting and retaining the handheld video game remote control,
   wherein the structure includes a channel configured to allow a cable to pass therethrough, the handheld video game remote control being configured to accept a connector that connects the handheld video game remote control to a further handheld controller having a motion sensor therein.

8. A video game accessory comprising:
   a tiltable freestanding compressible seat having a structure for removably accepting and retaining a handholdable video game remote control device having at least one acceleration sensor that senses motion and balance of a player sitting on said seat; and
   a graphics device wirelessly coupled to said handholdable video game remote control, said graphics device providing haptic feedback to said player that simulates a gait at which a movable platform travels through a virtual landscape in response to said sensed motion and balance,
   wherein the structure includes a channel configured to allow a cable to pass therethrough, the handholdable video game remote control being configured to accept a connector that connects the handholdable video game remote control to a further handheld controller having a motion sensor therein.

9. The accessory of claim 8 wherein said seat is inflatable.

10. The accessory of claim 8 wherein said movable platform comprises the back of a simulated horse.

11. The accessory of claim 8 wherein the further handheld controller in use simulates the reins of a horse.

12. The accessory of claim 8 wherein the acceleration sensor senses vibration and the graphics device causes a simulated displayed animal to begin moving in response to the sensed vibration.

13. A video game accessory comprising:
   a tiltable freestanding compressible seat having a structure for removably accepting and retaining a handholdable video game remote control device having at least one acceleration sensor that senses motion and balance of a player sitting on said seat; and
   a graphics device wirelessly coupled to said handholdable video game remote control, said graphics device providing haptic feedback to said player that simulates a gait at which a movable platform travels through a virtual landscape in response to said sensed motion and balance;
   wherein the handholdable video game remote control has user-manipulable controls thereon, and the receptacle comprises a rigid material that slidably accepts and retains the handholdable video game remote control therein and is configured to expose the user-manipulable controls to operation while the handholdable video game remote control is accepted and retained by the receptacle.

14. A video game accessory comprising:
   a tiltable freestanding compressible seat having a structure for removably accepting and retaining a handholdable video game remote control device having at least one acceleration sensor that senses motion and balance of a player sitting on said seat; and
   a graphics device wirelessly coupled to said handholdable video game remote control, said graphics device providing haptic feedback to said player that simulates a gait at which a movable platform travels through a virtual landscape in response to said sensed motion and balance;
   wherein the compressible seat transmits vibration generated by the handholdable video game remote control device at least in part in response to sensed acceleration.

15. A method of simulating horseback riding comprising:
   (a) providing a cushioning device configured to support a player, the cushioning device having a dome-shaped portion configured to support the cushioning device directly on a surface so that the cushioning device is tiltable with respect to the surface by a player sitting on the cushioning device;

(b) providing a receptacle on the cushioning device into which a handholdable video game remote control of the type having a gyrosensor can be removably inserted and retained;

(c) detecting, with the inserted handholdable video game remote control gyrosensor, the motion and balance of a player sitting on the cushioning device; and (d) in response to said detected motion and balance, using a processor to automatically dynamically generate a 3D graphics display simulating riding a horse.

16. A video game accessory for use with a video game system having a processor and a display, comprising:

an inflatable cushion dimensioned and configured for a user to straddle and sit on, the inflatable cushion including a rounded portion that enables the inflatable cushion to be supported on a surface in such a way that a person seated on the cushion can tilt the cushion in any direction; and a mounting structure affixed to said inflatable cushion, said mounting structure being dimensioned to removably accept an elongated handheld remote control device of the type that uses a gyrosensor to sense movement and balance of a person seated on the cushion, wherein a processor coupled to said handheld remote control device uses the sensed movement and balance of a person seated on said inflatable cushion to change the gait of a displayed simulated virtual animal.

17. The accessory of claim 16 wherein the mounting structure includes a channel configured to allow a cable to pass therethrough, the handheld video game remote control being configured to accept a connector that connects the handheld video game remote control to a further handheld controller having a motion sensor therein.

18. The accessory of claim 17 wherein the further handheld controller in use simulates the reins of a horse.

\* \* \* \* \*